(12) United States Patent
Khatuntsev

(10) Patent No.: US 10,145,671 B2
(45) Date of Patent: Dec. 4, 2018

(54) THREE DIMENSIONAL LASER MEASURING SYSTEM AND METHOD

(71) Applicant: Topcon Positioning Systems, Inc., Livermore, CA (US)

(72) Inventor: Nikolay V. Khatuntsev, Pleasanton, CA (US)

(73) Assignee: Topcon Positioning Systems, Inc., Livermore, CA (US)

( * ) Notice: Subject to any disclaimer, the term of this patent is extended or adjusted under 35 U.S.C. 154(b) by 280 days.

(21) Appl. No.: 15/086,377

(22) Filed: Mar. 31, 2016

(65) Prior Publication Data

US 2017/0284790 A1    Oct. 5, 2017

(51) Int. Cl.

| | | |
|---|---|---|
| *G01C 3/08* | (2006.01) | |
| *G01B 11/00* | (2006.01) | |
| *G01C 15/00* | (2006.01) | |
| *G01S 17/00* | (2006.01) | |
| *G01S 17/08* | (2006.01) | |
| *G01S 17/42* | (2006.01) | |
| *G01S 1/70* | (2006.01) | |
| *G01S 5/16* | (2006.01) | |
| *G01S 17/74* | (2006.01) | |

(52) U.S. Cl.
CPC .............. *G01B 11/002* (2013.01); *G01C 3/08* (2013.01); *G01C 15/00* (2013.01); *G01C 15/006* (2013.01); *G01S 1/70* (2013.01); *G01S 5/16* (2013.01); *G01S 17/003* (2013.01); *G01S 17/08* (2013.01); *G01S 17/42* (2013.01); *G01S 17/74* (2013.01)

(58) Field of Classification Search
CPC ........ G01B 11/002; G01C 3/08; G01C 15/00; G01C 15/006; G01S 1/70; G01S 5/16; G01S 17/003; G01S 17/08; G01S 17/42; G01S 17/74
See application file for complete search history.

(56) References Cited

U.S. PATENT DOCUMENTS

| | | |
|---|---|---|
| 3,710,335 A | 1/1973 | Lepley |
| 5,000,564 A | 3/1991 | Ake |
| 5,011,288 A | 4/1991 | Noji et al. |
| 5,260,770 A | 11/1993 | Nakamura et al. |
| 5,455,670 A | 10/1995 | Payne et al. |
| 5,771,978 A * | 6/1998 | Davidson ................ E02F 3/847 172/2 |
| 5,793,491 A * | 8/1998 | Wangler ................ G01S 7/4802 356/398 |

(Continued)

FOREIGN PATENT DOCUMENTS

| | | |
|---|---|---|
| JP | 62187271 A | 8/1987 |
| WO | 1993020458 A2 | 10/1993 |
| WO | 1998014798 A1 | 4/1998 |

OTHER PUBLICATIONS

International Search Report and Written Opinion dated May 10, 2017 in connection with PCT/US2017/012953, 13 pages.

(Continued)

*Primary Examiner* — Samantha K Abraham
(74) *Attorney, Agent, or Firm* — Chiesa Shahinian & Giantomasi PC

(57) ABSTRACT

A laser measuring system is provided by combining N-beams, angle based modulation and a laser receiver and laser transmitter configured with corner reflectors for signal shift measuring to facilitate full three dimensional positioning.

29 Claims, 12 Drawing Sheets

(56) References Cited

U.S. PATENT DOCUMENTS

| | | | |
|---|---|---|---|
| 5,880,822 A | | 3/1999 | Kubo |
| 5,883,719 A | * | 3/1999 | Coope .................... F41G 3/323 356/152.1 |
| 6,741,343 B2 | | 5/2004 | Shafer et al. |
| 7,196,302 B2 | | 3/2007 | Ohtomo et al. |
| 7,196,795 B2 | | 3/2007 | Ura et al. |
| 7,701,559 B2 | | 4/2010 | Bridges et al. |
| 7,800,758 B1 | | 9/2010 | Bridges et al. |
| 7,966,739 B2 | | 6/2011 | Kamizono et al. |
| 8,077,293 B2 | | 12/2011 | Hayashi et al. |
| 8,630,828 B2 | | 1/2014 | Parker |
| 8,659,749 B2 | | 2/2014 | Bridges |
| 8,763,266 B2 | | 7/2014 | Barber et al. |
| 8,788,154 B2 | | 7/2014 | O'Connor et al. |
| 2003/0136901 A1 | | 7/2003 | Ohtomo et al. |
| 2008/0018879 A1 | | 1/2008 | Kim et al. |
| 2009/0106989 A1 | * | 4/2009 | Kamizono ............... G01C 1/02 33/285 |
| 2015/0253428 A1 | * | 9/2015 | Holz ....................... G01S 17/42 356/5.01 |

OTHER PUBLICATIONS

Kyle et al., "Automated Part Positioning with the Laser Tracker," Dec. 31, 1997, retrieved on Dec. 11, 2014 from http://www.leica-geosystems.us/downloads123/zz/general/general/TruStories/Loser%20TRU_en.pdf, 9 pgs.

* cited by examiner

THREE DIMENSIONAL LASER MEASURING SYSTEM AND METHOD

TECHNICAL FIELD

The present invention relates generally to laser measuring systems and, more particularly, to a laser system utilizing rotary lasers for performing measurements for obtaining a position of an object.

BACKGROUND

Worksite preparation typically includes grading and excavating portions of the worksite to form desired finished topologies and footprints. Positional measuring is a critical element in most construction and agricultural worksite applications and the use of laser receivers to facilitate positional measurements in such applications is widespread. For example, laser receivers are commonly attached to construction equipment (e.g., dozers, scrapers, excavators, and the like) to improve grading and excavating accuracy.

With respect to laser detection, these laser receivers typically include multiple radiation or sensing arrays, which are spatially arranged in a vertical pattern and which respond to impingement by a radiation source such as a laser beam. To achieve high precision and 360 degree detection such lasers typically utilize three (3) or four (4) sensing arrays spaced at 120 degree or 90 degree intervals, as the case may be. Each array of the laser receiver includes multiple individual photo detectors and associated monitoring circuitry.

One established laser measuring technique and measuring system utilizes a projection of a laser beam by a rotary irradiation (e.g., a laser transmitter) for the purpose of forming a horizontal reference plane or a reference plane tilted with respect to the horizontal reference plane at a predetermined angle and by which it is possible to measure a position by using the transmitted laser beam. In this way, the applicable measuring instruments measure the coordinates of a point by sending a laser beam to the point. The laser beam may impinge directly on the point or may impinge on a retro reflector target that is contact with the point. The measuring instruments determine the coordinates of the point by measuring the distance and two angles to the target. For example, in U.S. Pat. No. 7,196,302 to F. Ohtomo et al. (hereinafter "Ohtomo"), U.S. Pat. No. 7,966,739 to F. Kamizono et al. (hereinafter "Kamizono"), and U.S. Pat. No. 8,788,154 to R. M. O'Connor et al. (hereinafter "O'Connor") laser surveying and laser measuring systems are described that utilize N-beams in combination with certain photo detection techniques to measure positional data. However, while the aforementioned systems provide highly accurate results, the ability to utilize multiple, independent laser receivers to simultaneously calculate positions remains a challenge.

Therefore, a need exists for a three dimensional (3D) measuring system that allows for the use of multiple, independent laser receivers to simultaneously calculate positions without any need to communicate with the laser transmitter.

BRIEF SUMMARY OF THE EMBODIMENTS

In accordance with various embodiments, a 3D laser measuring system is provided by combining N-beams, angle based modulation and a laser receiver and laser transmitter configured with a reflective surface for signal shift measuring to facilitate full 3D positioning.

In accordance with an embodiment, a laser receiver and laser transmitter are each provided with at least one reflective surface (e.g., a corner reflector with mirror edges or a flat surface of a retro reflector). Essentially, the at least one reflective surface will return a significant amount of light to substantially the same attack angle from which the incoming light was received at the reflective surface. The laser transmitter projects N-shaped beams in rotary irradiation at a constant speed and is further configured to modulate (either using frequency modulation, phase modulation, or other known more complex modulation schemes) the laser signal with an instant azimuth angle associated with the transmitter's current position. In this way, one or more laser receivers receiving the transmitted modulated laser signal will be able to estimate their azimuthal position (i.e., an angle) by measuring the frequency of the modulated signal pulse, measuring the phase, or by demodulating the complex signal. Further, in accordance with the embodiment, a distance (i.e., the distance between the transmitter and the object to which the receiver is affixed) can also be determined at the receiver using the modulated signal and at least two signal reflections between the transmitter and receiver. That is, configuring both the transmitter and receiver with certain reflective surfaces, as mentioned above, will allow for the receiver to calculate the distance using a double-reflected modulated signal between itself and the transmitter. In particular, the receiver will compare the signal differences (e.g., phase differences when there is no signal overlap (in long distances), or phase drift of a signal trail when there is signal overlap (in short distances)) between the first signal received and the reflected signal received thereafter to calculate the distance.

In accordance with the embodiment, full 3D positioning is achieved wherein a first coordinate (i.e., a vertical angle) is calculated utilizing the transmitted N-beams, a second coordinate (i.e., an azimuthal angle) is calculated as detailed above using the modulated signal with azimuth information, and a third coordinate (i.e., a distance) is calculated as detailed above using multiple signal reflections. Of course, in addition to being used together, each of the coordinate measurements associated with the 3D positioning of the embodiments herein may be utilized independently from the other coordinate measurements. As such, various different combinations of coordinates can be implemented (e.g., distance and azimuthal angle, azimuthal angle alone, vertical and azimuthal angles, and full 3D, to name just a few) in accordance with various embodiments.

Further, such full 3D positioning is delivered by the receiver with no communication to the transmitter.

In accordance with a further embodiment, multiple receivers can be provided such that two angles are provided by a transmitter independent from the presence of any receiver such that any number of multiple receivers may measure their angles substantially simultaneously provided that such receiver each receive light from the transmitter and such receivers do not shade each other. In this embodiment, the distance measurement is a semi-passive measurement in that it requires only a first light strike from the transmitter and the passive reflections of light by the transmitter's reflector. In particular, the reflector on the transmitter will reflect any light independent of any receiver present (i.e., the receiver are considered passive in such configuration).

These and other advantages of the embodiments will be apparent to those of ordinary skill in the art by reference to the following detailed description and the accompanying drawings.

DETAILED DESCRIPTION

In accordance with various embodiments, a 3D laser measuring system is provided by combining N-beams, angle based modulation and a laser receiver and laser transmitter configured with a reflective surface for signal shift measuring to facilitate full 3D positioning.

Figure 1:
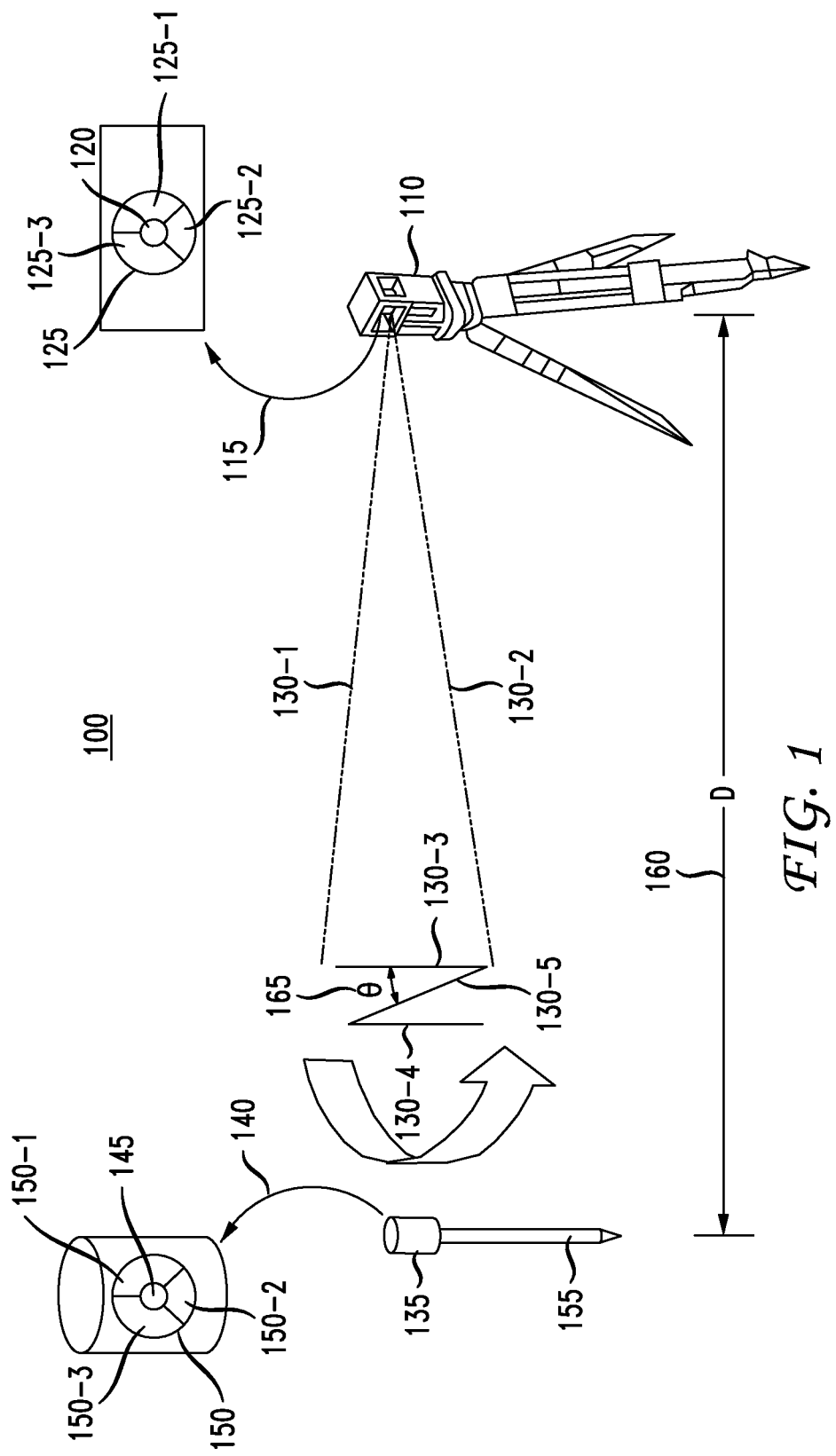
FIG. 1 shows a schematic perspective view of a 3D laser measuring system in accordance with an embodiment.

FIG. 1 shows a schematical perspective view of 3D laser measuring system in accordance with an embodiment. In accordance with the embodiment, laser receiver 135 and laser transmitter 110 are each provided with at least one reflective surface (e.g., either a corner reflector with mirror edges or a flat surface of a retro reflector). Illustratively, as shown in exploded view 140, laser receiver 135 has reflective surface 150 configured with a corner reflector having mirrored edges 150-1, 150-2 and 150-3, respectively, and configured around photo diode window 145. Laser receiver 135 is illustratively shown attached to a surveying pole 155 but it will be understood that various configurations of laser receiver 135 are possible, for example, laser receiver 135 can be attached to construction equipment (e.g., a dozer) on a worksite or be a handheld device. Alternatively, reflective surface 150 may be a flat retro reflector surface. Similarly, as shown in exploded view 115, laser transmitter 110 has reflective surface 125 configured with a corner reflector having mirrored edges 125-1, 125-2 and 125-3, respectively, and configured around laser diode window 120. Alternatively, as with laser receiver 135, reflective surface 125 may be a flat retro reflector surface where the reflective surface is in rotation with the laser beam.

Laser transmitter 110 projects N-shaped beams, for example, N-shaped beams 130-1 and 130-2, which have a plurality of fan-shaped beams in rotary irradiation at a constant speed in a well-known fashion (see, e.g., Kamizono, O'Connor and/or Ohtomo). As such, the N-shaped beams 130-1 and 130-2 are projected so that the cross-section of the luminous fluxes of such beams is formed in an N-shape, illustratively shown as vertical beam 130-3, vertical beam 130-4 and beam 130-5 tilted at angle θ 165 on a diagonal line with respect to vertical beam 130-3 and vertical beam 130-4. As will be appreciated, while the illustrative embodiments herein are described using N-shaped beams, including the addition of two additional coordinates within the N-beam system, it will be understood that any type of laser beam that can be configured with the frequency or phase modulation data as detailed herein can also be utilized. For example, in a non-N-beam system, an embodiment would provide only the azimuthal angle and distance.

In accordance with the embodiment, laser transmitter 110 is further configured to modulate N-shaped beams 130-1 and 130-2 (either using frequency modulation or phase modulation) with data specifying an azimuth angle associated with the current position of laser transmitter 110. In this way, laser receiver 135, upon receiving the transmitted modulated laser signal will be able to directly estimate its azimuthal position (i.e., an angle) by measuring the frequency or phase, as the case may be, of the modulated signal pulse. Further, in accordance with the embodiment, distance 160 (illustratively, the distance between laser transmitter 110 and laser receiver 135) can also be determined at laser receiver 135 using the modulated signal and the signal reflections between laser transmitter 110 and laser receiver 135 (e.g., for long distances, one direct light pulse and one reflected light pulse is sufficient, and for short distances, two or more reflected light pulses are typically generated in such a configuration). Essentially, in accordance with the embodiment, a short distance is defined if the duration of a single laser strike (e.g., at laser receiver 135) is greater than the roundtrip time associated with the time of light. Alternatively, a long distance is defined if the duration of the single laser strike e.g., at laser receiver 135) is smaller than the roundtrip time associated with the time of light. As will be appreciated, the duration of the single laser strike is inversely proportional with distance. That is, configuring both laser transmitter 110 and laser receiver 135 with certain reflective surfaces, as detailed above, will allow for laser receiver 135 to calculate distance 160 using the double-reflected modulated signal between itself and laser transmitter 110. In particular, laser receiver 135 will compare the signal differences (e.g., phase differences) between the first signal received and the reflected signal (i.e., a second signal) received to calculate such distance.

Figure 2:
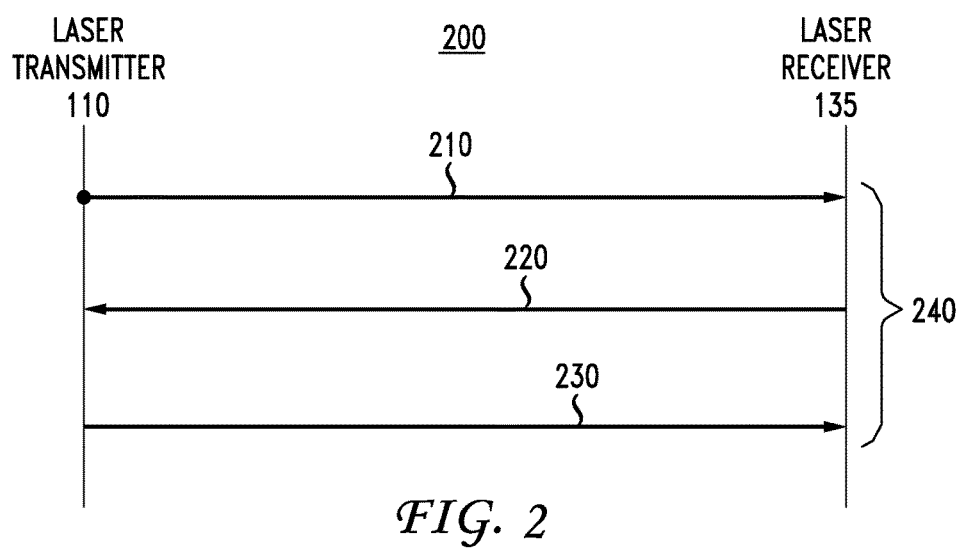
FIG. 2 shows an explanatory diagram of modulated laser beam transmission and reflection in accordance with an embodiment.

For example, FIG. 2 shows an explanatory diagram 200 of modulated laser beam transmission and reflection in accordance with an embodiment. As illustrated, the initial laser light pulse 210 (e.g., N-beams 130-1 and 130-2 of FIG. 1) is transmitted from laser transmitter 110 configured with reflective surface 125 and received by laser receiver 135 also configured with reflective surface 150. As such, this initial light pulse will be reflected off laser receiver 135 as reflected light pulse 220 back towards the laser transmitter. In turn, reflected light pulse 220 will be reflected off the laser transmitter back towards laser receiver which will detect reflected light pulse 230, and for which signal difference 240 (i.e., the frequency or phase difference, as the case may be) can be determined in a well-known fashion.

Advantageously, in accordance with the embodiment, full 3D positioning is achieved wherein a first coordinate (i.e., a vertical angle) is calculated utilizing the transmitted, modulated N-beams, a second coordinate (i.e., an azimuthal angle) is calculated as detailed above using the modulated signal with azimuth information, and a third coordinate (i.e., a distance) is calculated as detailed above using multiple signal reflections. Further, such full 3D positioning is delivered by the receiver with no communication to the transmitter. That is, the receiver passively demodulates all information with respect to the receiver's coordinates thereby eliminating the need for any communication to the transmitter. As such, the transmitter is broadcasting all the required information and passively reflects the light, as detailed herein. Of course, in addition to being used together, each of the coordinate measurements associated with the 3D positioning of the embodiments herein may be utilized independently from the other coordinate measurements. As such, various different combinations of coordinates can be implemented (e.g., distance and azimuthal angle, azimuthal angle alone, vertical and azimuthal angles, and full 3D, to name just a few) in accordance with various embodiments.

Figure 3:
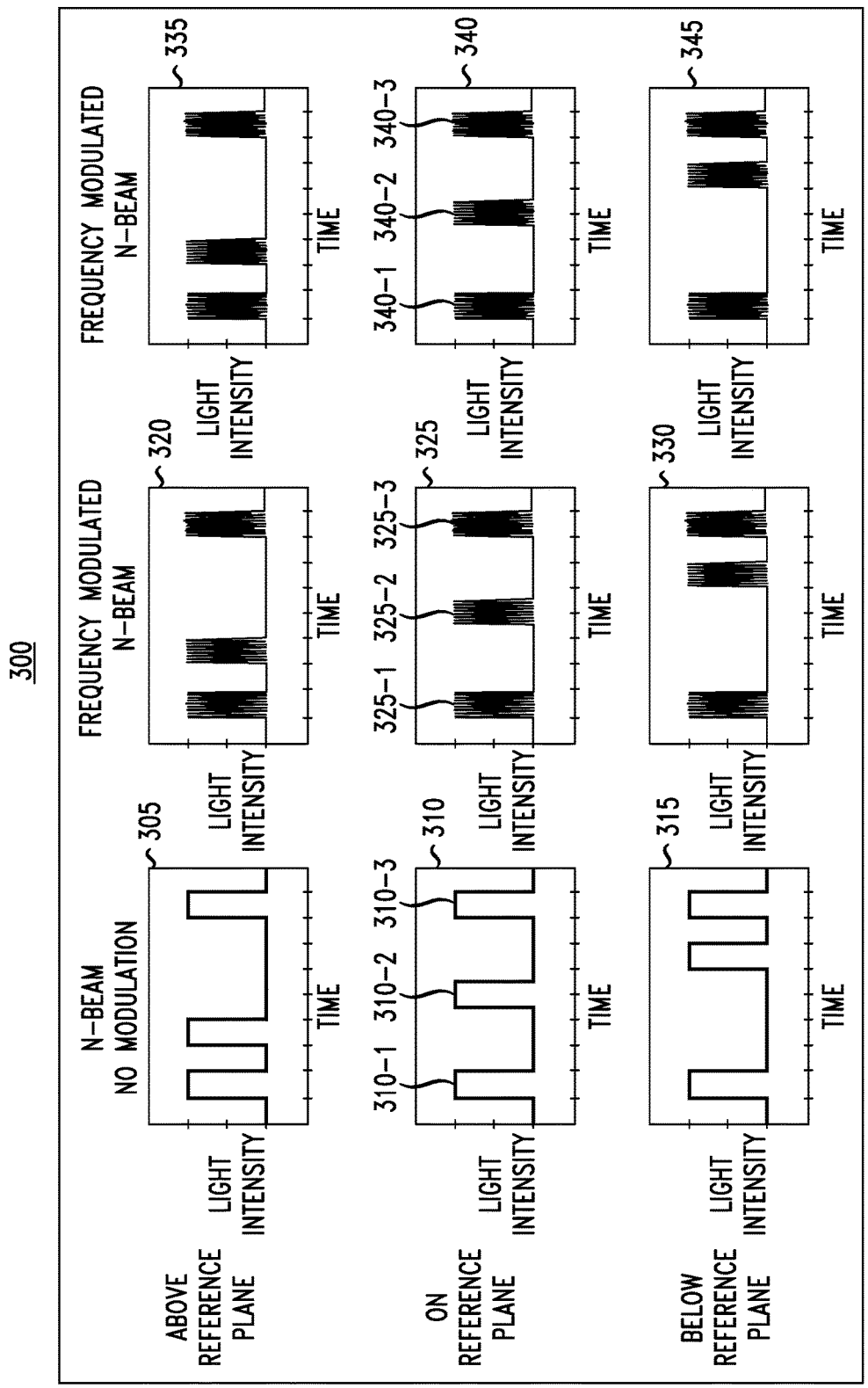
FIG. 3 shows various scenarios of N-beam transmissions in unmodulated states and frequency modulated states in accordance with various embodiments.

To further the understanding of the various embodiments, FIG. 3 shows several scenarios 300 of N-beam transmissions in unmodulated states and frequency modulated states in accordance with various embodiments. As shown, scenarios 300 show comparisons of the N-beam transmissions where the N-beam transmission, either unmodulated or modulated, is either above reference plane, on reference or below reference plane. More particularly, the unmodulated N-beam scenarios are shown in graph 305 (above reference plane), graph 310 (on reference plane), and graph 315 (below reference plane), all such graphs having an "X" axis of time vs. a "Y" axis of light intensity. Two different frequency modulated N-beam scenarios are shown in embodiments which are distinguished by overall frequency and azimuth angle. That is, graph 320 (above reference plane), graph 325 (on reference plane), and graph 330 (below reference plane) depict a frequency modulated N-beam, as detailed above, where the azimuth angle is smaller (and the corresponding frequencies) as compared to the other frequency modulated scenarios depicted by graph 335 (above reference plane), graph 340 (on reference plane), and graph 345 (below reference plane) all such graphs having an "X" axis of time vs. a "Y" axis of light intensity.

Turning our attention to the respective "on reference plane" scenarios in FIG. 3, the above-described principles will be further described. It will be understood that such principles and discussion apply equally to the "above reference plane" and "below reference plane" scenarios. In particular, graph 310 shows three unmodulated N-beam pulses (i.e., pulses 310-1, 310-2, and 310-3). As will be readily understood, pulse 310-2 (the so-called "middle" pulse) is key in N-beam measurements because the time duration between two outer pulses is approximately constant for a certain rotation rate of the transmitter and is used as a time reference. As such, the timing of the middle pulse shows the vertical angle of the N-beam system, and the ratio of time before and after the middle pulse is proportional to the vertical angle. Graph 325 shows three frequency modulated N-beam pulses (i.e., pulses 325-1, 325-2, and 325-3), and graph 340 shows frequency modulated N-beam pulses (i.e., pulses 340-1, 340-2, and 340-3). As can be seen when comparing, for example, pulse 340-1 with pulse 325-1 the frequency of modulation of pulse 340-1 is greater than that of pulse 325-1. For example, the frequency modulated N-beam pulses on graph 340 are greater than the frequency modulated N-beam pulses on graph 325. In this way, if the azimuthal angle is proportional to the modulation frequency, the frequency modulated N-beam pulses of graph 340 were taken at larger azimuthal angles than the frequency N-beam pulses of graph 325.

Figure 4A:
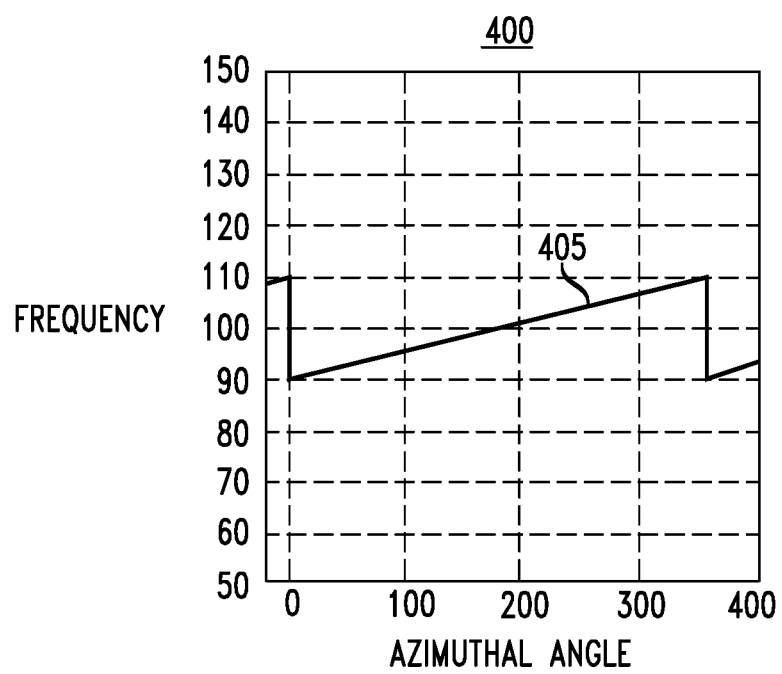
FIGS. 4A, 4B, and 4C show exemplary signal plots of various frequency modulated laser beam configurations, each such configuration in accordance with an embodiment.
Figure 4B:
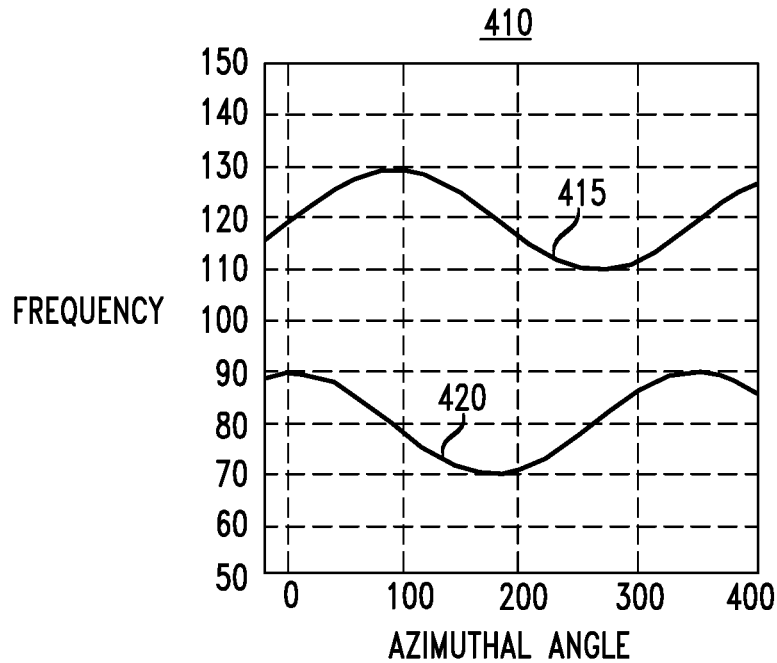
Figure 4C:
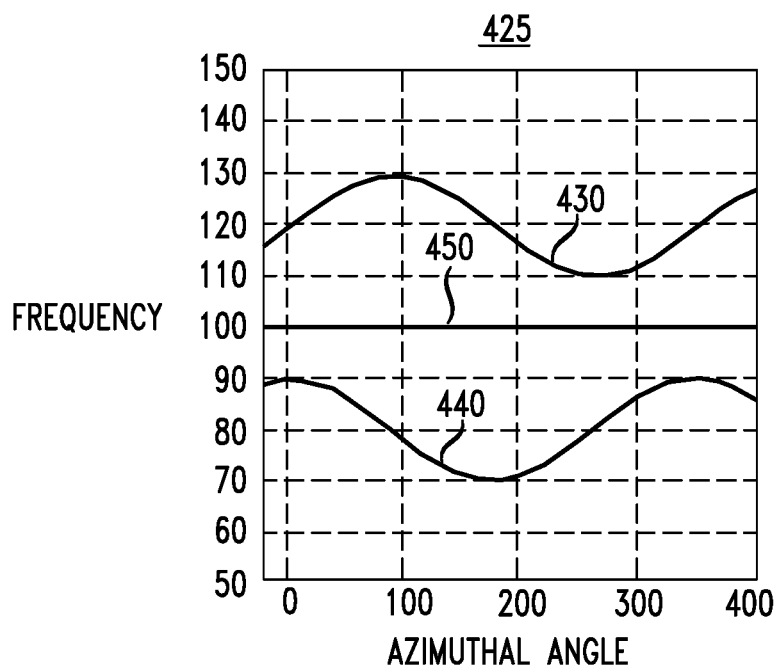

FIGS. 4A, 4B and 4C show exemplary signal plots of various frequency modulated laser beam configurations in accordance with an embodiment. For example, FIG. 4A shows graph 400 having plot 405 which illustrates an embodiment of a basic N-beam frequency modulation where frequency is proportional to azimuth angle. As will be appreciated, in this scenario, at an azimuth angle of zero (0) there exists a frequency jump (i.e., from 90 to 110) that may adversely impact the laser receiver's ability to determine position. For example, if the receiver is located exactly at an angle of 0 degrees it will either receive no modulated signal, or will receive a signal with the frequency modulated between 90 and 110 degrees which will adversely impact the laser receiver's ability to accurately determine position. An alternative to the proportionality between frequency and azimuth angle is shown in FIG. 4B where in this embodiment graph 410 shows plot 415 and plot 420 which illustrate two different N-beam modulated signals where frequency is plotted against the sine (plot 415) and cosine (plot 420) functions of azimuthal angle. As shown, the frequency jumps of the signal depicted in FIG. 4A have been eliminated in FIG. 4B thereby improving the laser receiver's ability to determine position across all frequencies. In this case, there are no frequency jumps and for each azimuthal angle there is a unique combination of frequencies. In the third signal plot shown in FIG. 4C, graph 425 shows an embodiment of plot 430, plot 440 and plot 450. Plots 430 and 444, respectively, are the same sine and cosine plots as in FIG. 4B and plot 450 is a reference signal with constant frequency. As will be appreciated, a constant frequency reference signal is useful in compensating for crystal oscillator error and/or for Doppler effects in the case where laser receiver 135 moves towards or away from the transmitter.

Figure 4D:
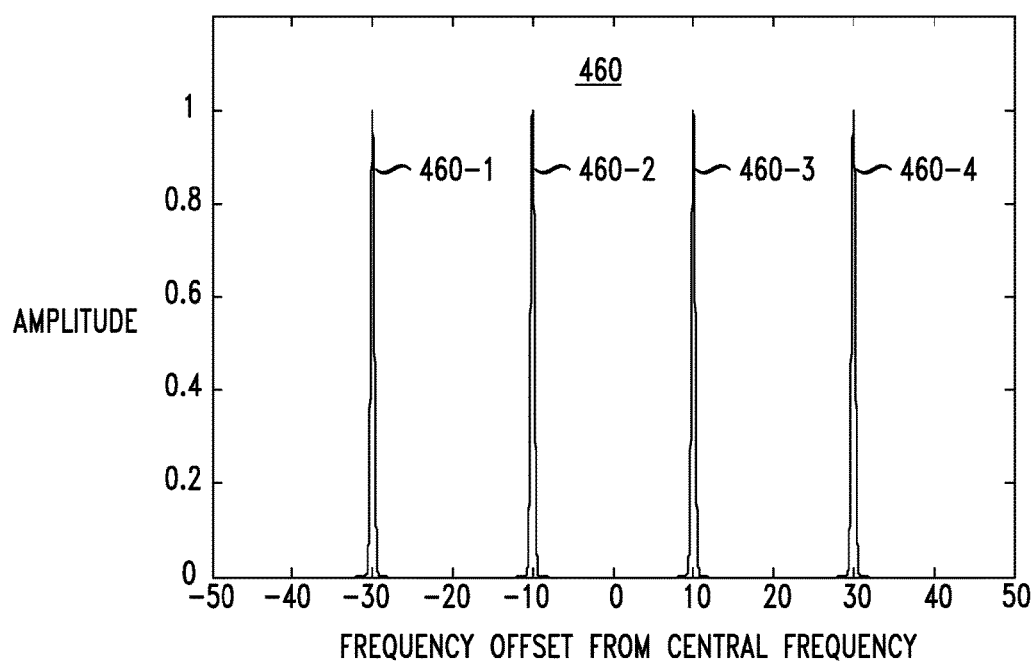
FIG. 4D shows an exemplary signal plot of a phase modulated laser beam configuration in accordance with an embodiment.

FIG. 4D shows an exemplary signal plot of a phase modulated laser beam configuration in accordance with an embodiment. For example, FIG. 4D shows graph 460 which shows frequency of offset from a central frequency (X axis) vs. amplitude (Y axis) in plot 460-1, plot 460-2, plot 460-3, and plot 460-4, collectively illustrating an embodiment of angle based complex phase modulation. Plot 460-1 and plot 460-4, respectively, are directed to plots of reference subcarriers which are synchronized and have an initial phase of zero. Plot 460-3 is a plot of a phase modulated subcarrier where the phase modulation is directly proportional to the instant angle of rotation of the transmitter. For example, if the transmitter rotates at 10 Hz this subcarrier will be shifted from an initial position to 10 Hz left or right (dependent upon the modulation polarity). Plot 460-2 is a plot of a subcarrier for precise phase estimation which is modulated with the same instant angle of the transmitter but multiplied by a defined integer value (e.g., power of 2). Such a subcarrier will have certain cycle ambiguities but the angle can be measured with better precision. For example, if the multiplier is 256 and the rate of rotation of the transmitter is 10 Hz, the subcarrier will be shifted to 2560 Hz. In this case, the subcarrier provides for a coarser estimation of the azimuthal angle with no ambiguities. As will be appreciated, different subcarriers may be combined to enhance measuring accuracy. For example, a combination of the phase modulated subcarrier (shown by plot 460-3) with that of the precise subcarrier of plot 460-2 will provide enhanced precision relative to the reference (0 phase) subcarriers shown in plots 460-1 and 460-4, respectively. Of course, as will be appreciated, any number of different combinations with various total number of subcarriers exist for such angle measurement but ideally there should always be at least one reference subcarrier (0 phase) and at least one full circle subcarrier (1X phase).

Figure 4E:
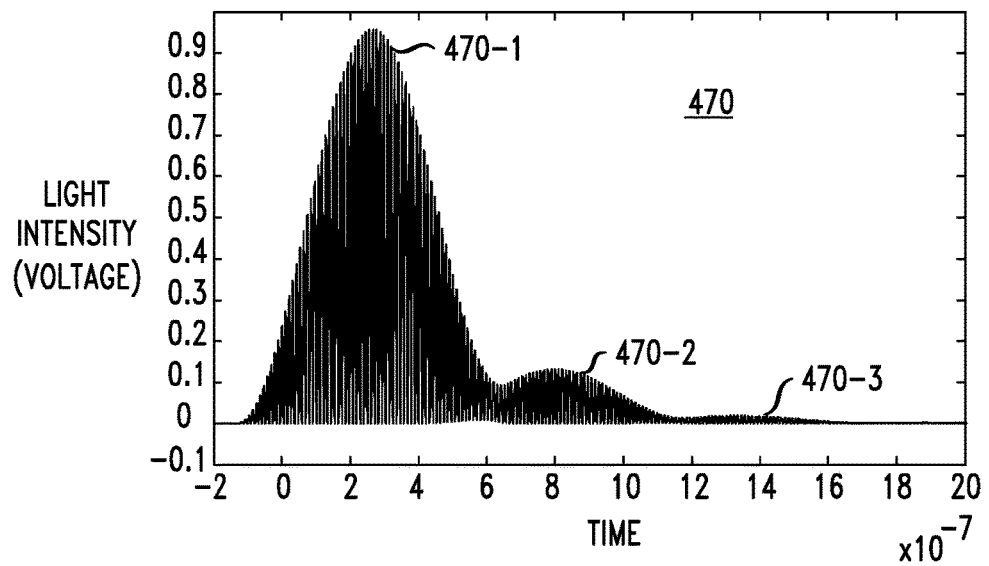
FIGS. 4E and 4F show exemplary signal plots of a received signal and such signal's associated phase in accordance with an embodiment.
Figure 4F:
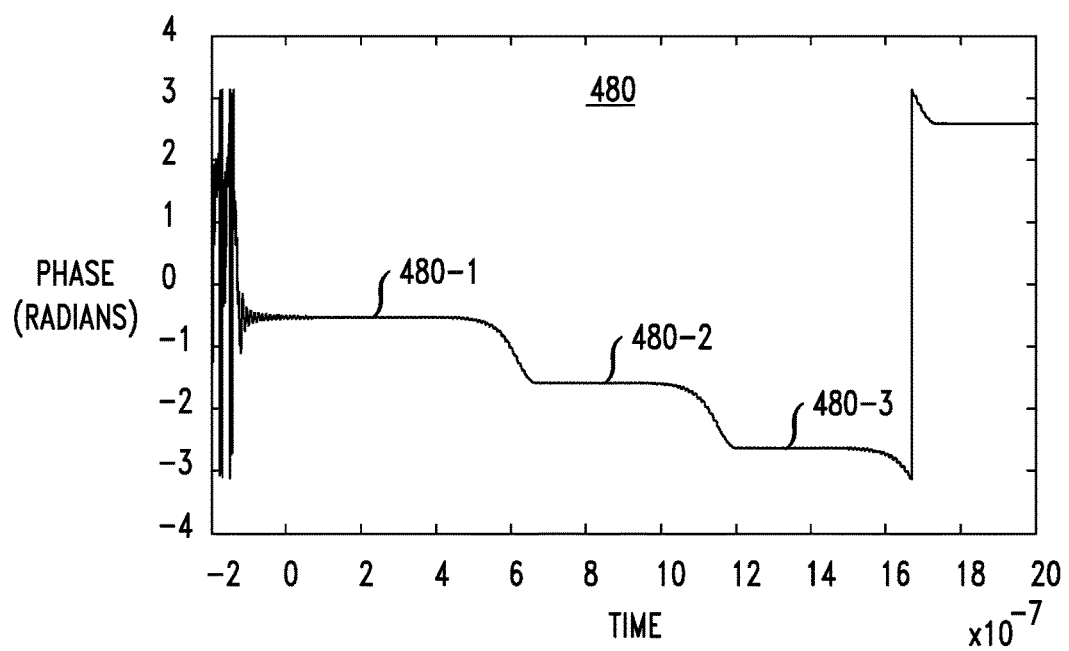

FIGS. 4E and 4F show exemplary signal plots of a received signal and such signal's associated phase in accordance with an embodiment. In particular, FIG. 4E shows an embodiment of how a signal with one or more reflections might look at the receiver after photo-detection. Illustratively, graph 470 shows the signal from one subcarrier (plotted as time (X axis) vs. light intensity (voltage) on the Y axis) in which a first portion of the plot 470-1 is a direct light strike, the second portion of the plot 470-2 is the reflection back and forth (between transmitter and receiver), and the third portion of the plot 470-3 is a double reflection back and forth (between transmitter and receiver).

FIG. 4F shows graph 480 which is a corresponding phase graph (plotted as time (X axis) vs. phase (radians) on the Y axis) to that of graph 470 shown in FIG. 4E. A first portion of the plot 480-1 is a direct light strike. Such direct light strikes from all subcarriers will provide information associated with the azimuthal angle such that for measuring distance only the phase step (i.e., the difference between plot 480-2 and plot 480-1) between the direct strike and the reflected signal is important. The distance calculation is given by:

$$PS = (2*\pi*2*d*f/c) + (2*\pi*n),\quad\text{(Equation 1)}$$

where PS is the phase step in radians (i.e., the difference between plot 480-2 and 480-1, or the difference between plot 480-3 and plot 480-2), d is the distance between the transmitter and the receiver (in meters), illustratively, distance 160 between laser transmitter 110 and laser receiver 135 as detailed above, f is the frequency of the subcarrier (in Hz), c is the speed of light (in meters/second), and n is the an integer value representing the number of cycles.

As will be appreciated, a single phase step measurement will have certain cycle ambiguities such that multiple subcarriers must be utilized to resolve any such ambiguities.

Figure 4G:
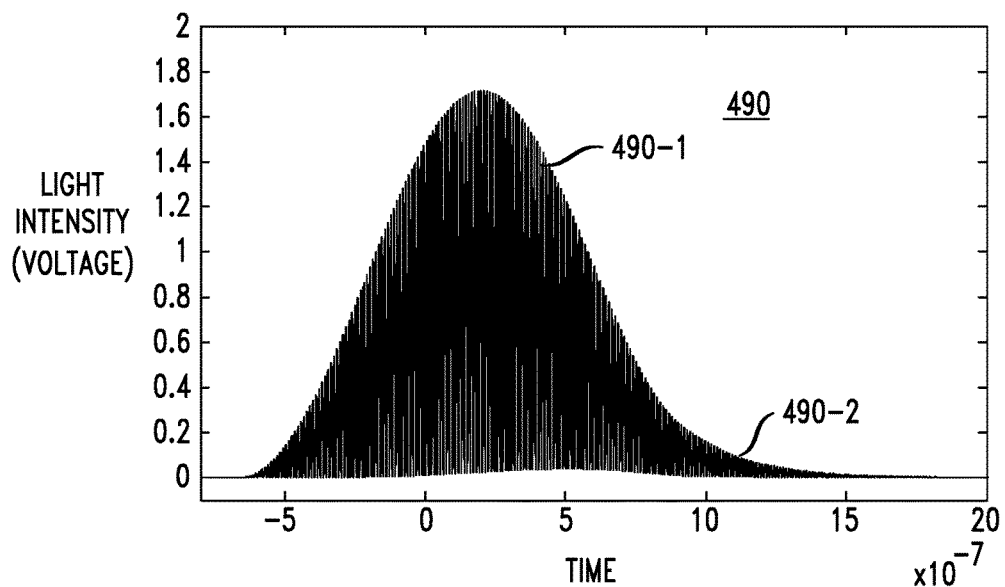
FIGS. 4G and 4H show exemplary signal plots of a received signal and such signal's associated phase in accordance with a further embodiment.
Figure 4H:
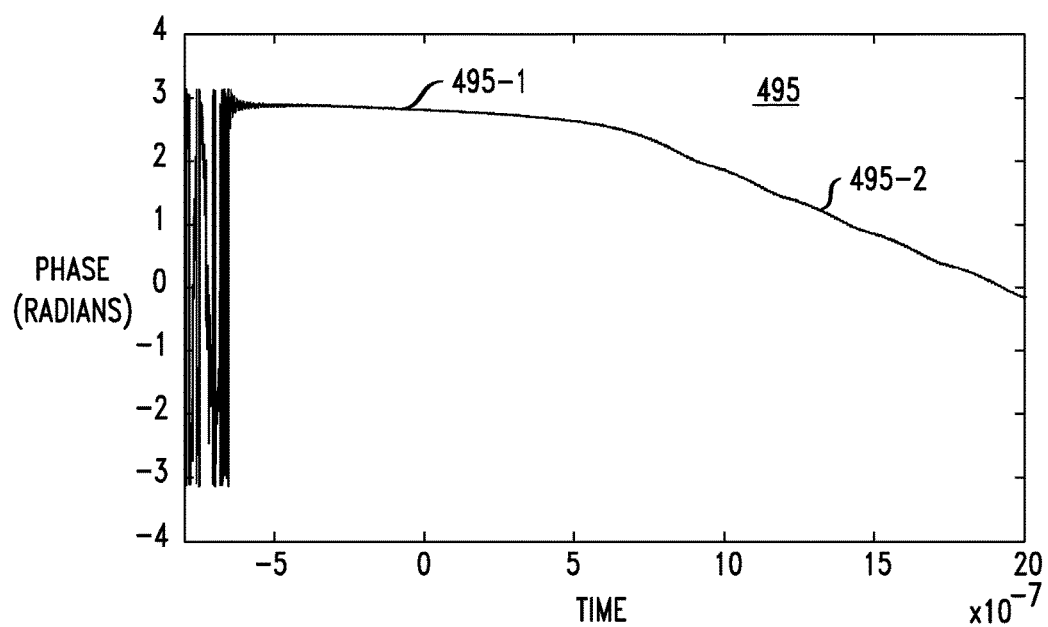

FIGS. 4G and 4H show exemplary signal plots of a received signal and such signal's associated phase in accordance with a further embodiment. In particular, FIG. 4G shows an embodiment of how a signal with one or more reflections might look at the receiver after photo-detection where the duration of the light strike exceeds the time between successive reflections (between the receiver and transmitter). Illustratively, graph 490 shows the signal from one subcarrier (plotted as time (X axis) vs. light intensity (voltage) on the Y axis) in which a first portion of the plot 490-1 represents a direct laser strike, and the plot 490-2 is the trailing edge where multiple reflections (i.e., back and forth) have occurred. As such, the trailing edge contains the information necessary to determine distance.

FIG. 4H shows graph 495 which is a corresponding phase graph (plotted as time (X axis) vs. phase (radians) on the Y axis) to that of graph 490 shown in FIG. 4G. A first portion of the plot 495-1 is the phase of a direct light strike with subsequent phase drift as shown in the second portion of the plot 495-2, for example. The so-called "trail frequency" carries information associated with distance and is given by the ratio of the phase drift (i.e., dphase/dt) The trail frequency is close to the subcarrier frequency but has integer wavelengths measured by the distance that light travels between reflections (i.e., standing wave). The distance measurement is made by using the trail frequencies of all subcarrier signals. The trail frequency ($t_{freq}$) is given by:

$$T_{freq} = n*c/(2*d),\quad\text{(Equation 2)}$$

where $T_{freq}$ is in Hz, c is the speed of light (in meters/second), d is the distance between the transmitter and receiver (in meters, and n is an integer (representing cycle ambiguity).

Figure 5:
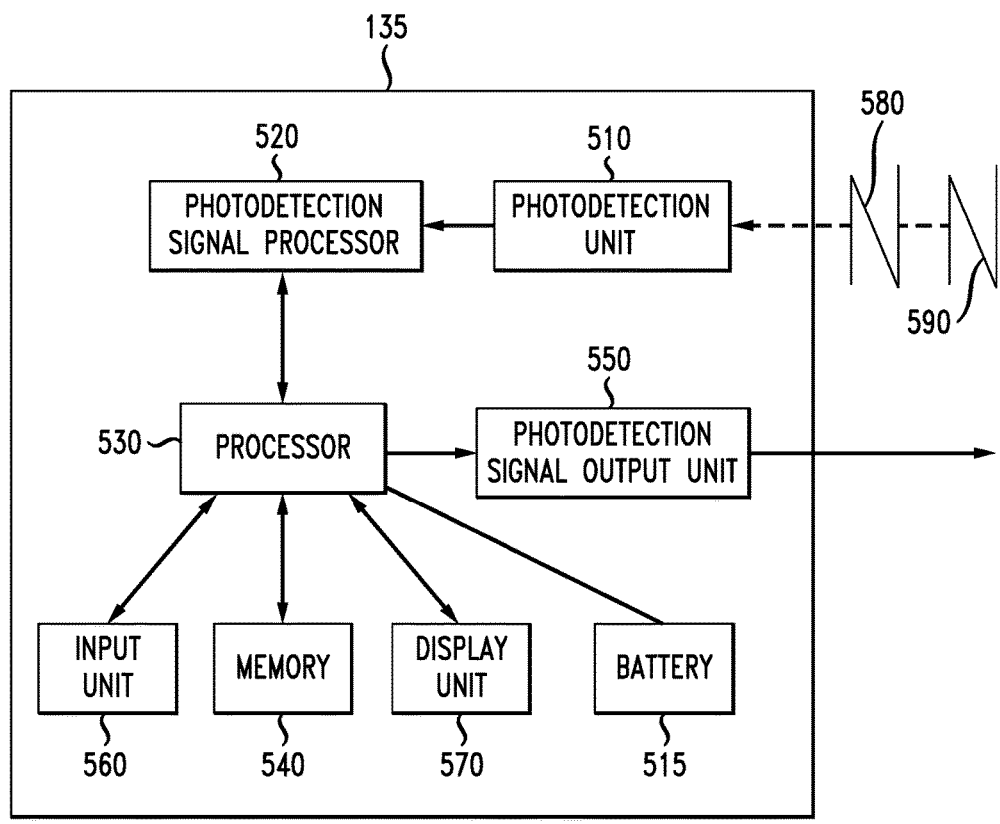
FIG. 5 shows a high-level block diagram of the laser receiver of FIG. 1 in accordance with an embodiment.

FIG. 5 shows a high-level block diagram of laser receiver 135 of FIG. 1 in accordance with an embodiment. As shown, laser receiver 135 includes photo-detection unit 510 for detecting incoming N-beams 580 and 590 (such N-beams being configured the same as N-beams 130-1 and 130-2 as shown in FIG. 1) with the photo-detection unit 510 including a plurality of photodetectors (not shown). As detailed herein, while FIG. 5 shows multiple N-beams for illustrative purposes, the various embodiments herein require only one N-beam to achieve the full 3D positioning as detailed herein. Upon receiving N-beam 580 and/or N-beam 590, a photo detection signal is provided as input to photo detection signal processor 520 where it is detected (i.e., determined) whether light has been received or not by laser receiver 135. As will be appreciated, any required signal processing such A/D conversion is performed, in a well-known manner, and the modulated data superimposed on N-beams 580 and 590 is extracted and analyzed by photo detection signal processor 520 in conjunction with processor 530. Battery 515 supplies power to laser receiver 135 in a well-known fashion and may be either a rechargeable battery (e.g., NiMH) or an alkaline battery, for example. Illustratively, laser receiver 135 may also be powered, in a well-known fashion, from a machine (e.g., dozer, tractor, grader, etc.) associated with such laser receiver.

That is, in accordance with the embodiment, laser transmitter 110 is configured to modulate N-shaped beams 580 and 590 (using frequency modulation or phase modulation, as detailed above) with an azimuth angle associated with the current position of the laser transmitter from which such beams originated, e.g., laser transmitter 110. In this way, laser receiver 135, upon receiving the transmitted modulated laser signal will be able to estimate its azimuthal position (i.e., an angle) by measuring the parameters of the modulated signal pulse. Illustratively, memory 540 is provided with a variety of programs that when executed will carry out this and other operations of the various embodiments. Further, in accordance with the embodiment, the distance between the laser receiver and laser transmitter (illustratively, distance 160 between laser transmitter 110 and laser receiver 135) can also be determined directly by laser receiver 135 by using the modulated signal and at least two signal reflections between laser transmitter 110 and laser receiver 135, as detailed above. That is, configuring both laser transmitter 110 and laser receiver 135 with certain reflective surfaces, as detailed above, will allow for laser receiver 135 to calculate distance 160 using the double-reflected modulated signal between itself and laser transmitter 110. In particular, laser receiver 135 will compare the signal differences (e.g., phase or frequency) between the first signal received and the reflected signal received to calculate such distance which can be reported, illustratively, to a user through display unit 570 and/or using photo detection signal output unit 550 (e.g., via wired or wireless communications link(s)). In such a scenario, a computer, illustratively, receives the information and controls an associated piece of machinery in a well-known fashion. Such user may also employ input unit 560 to take action based on the estimated 3D positioning provided and/or provide certain input to laser receiver 135 for operational purposes.

The above-described operations, in accordance with an embodiment, are mathematically represented as follows:

$$\text{Vertical angle } \varphi = k*(a\tan(t_{12}/t_{23}) - \pi/4),\quad\text{(Equation 3)}$$

where k—is the coefficient that describes physical alignment of N beam prisms (the angle of middle bar in 'N'); t12—is the time between first reference and middle signal (e.g., the difference between plot 310-2 and plot 310-1 as shown in FIG. 3); t23—is the time between middles signal and the last reference (e.g., the difference with plot 310-3 and 310-2 as shown in FIG. 3).

$$\text{Azimuthal angle } \theta = ph_{x1} ph_{ref},\quad\text{(Equation 4)}$$

where $ph_{x1}$—is the demodulated phase from x1 (rough) subcarrier signal (e.g., plot 460-3 as shown in FIG. 4D), $ph_{ref}$—is the demodulated phase from reference subcarrier signal (e.g., plot 460-1 and plot 460-4, respectively, as shown in FIG. 4D).

Radial distance is calculated from a system of equations:

$$r = (2*\pi*n_1 + \text{phase}_{1reflected} - \text{phase}_{1direct})*c/(2*2*\pi*f_1);$$

$$r = (2*\pi*n_2 + \text{phase}_{2reflected} - \text{phase}_{2direct})*c/(2*2*\pi*f_2);$$

$$r = (2*\pi*n_3 + \text{phase}_{3reflected} - \text{phase}_{3direct})*c/(2*2*\pi*f_3);$$

$$r = (2*\pi*n_4 + \text{phase}_{4reflected} - \text{phase}_{4direct})*c/(2*2*\pi*f_4); \quad\text{(Equation 5)}$$

where $n_1$, $n_2$, $n_3$, and $n_4$ are unknown integers; $\text{phase}_{1234reflected}$—are the phases of reflected signals for each subcarrier signals (e.g., plot 480-2 as shown in FIG. 4F), $\text{phase}_{1234direct}$—are the phases of direct laser strike (e.g., plot 480-1 as shown in FIG. 4F); $f_1$, $f_2$, $f_3$, and $f_4$ are the subcarrier frequencies.

Advantageously, by combining N-beams, angle based modulation, and reflected signaling (with phase shift measurement), full 3D positioning is enabled at the laser receiver, and a system that can include multiple laser receivers that are enabled to calculate such 3D positions without any need to communicate with the laser transmitter. Of course, in addition to being used together, each of the coordinate measurements associated with the 3D positioning of the embodiments herein may be utilized independently from the other coordinate measurements. As such, various different combinations of coordinates can be implemented (e.g., distance and azimuthal angle, azimuthal angle alone, vertical and azimuthal angles, and full 3D, to name just a few) in accordance with various embodiments.

Figure 6:
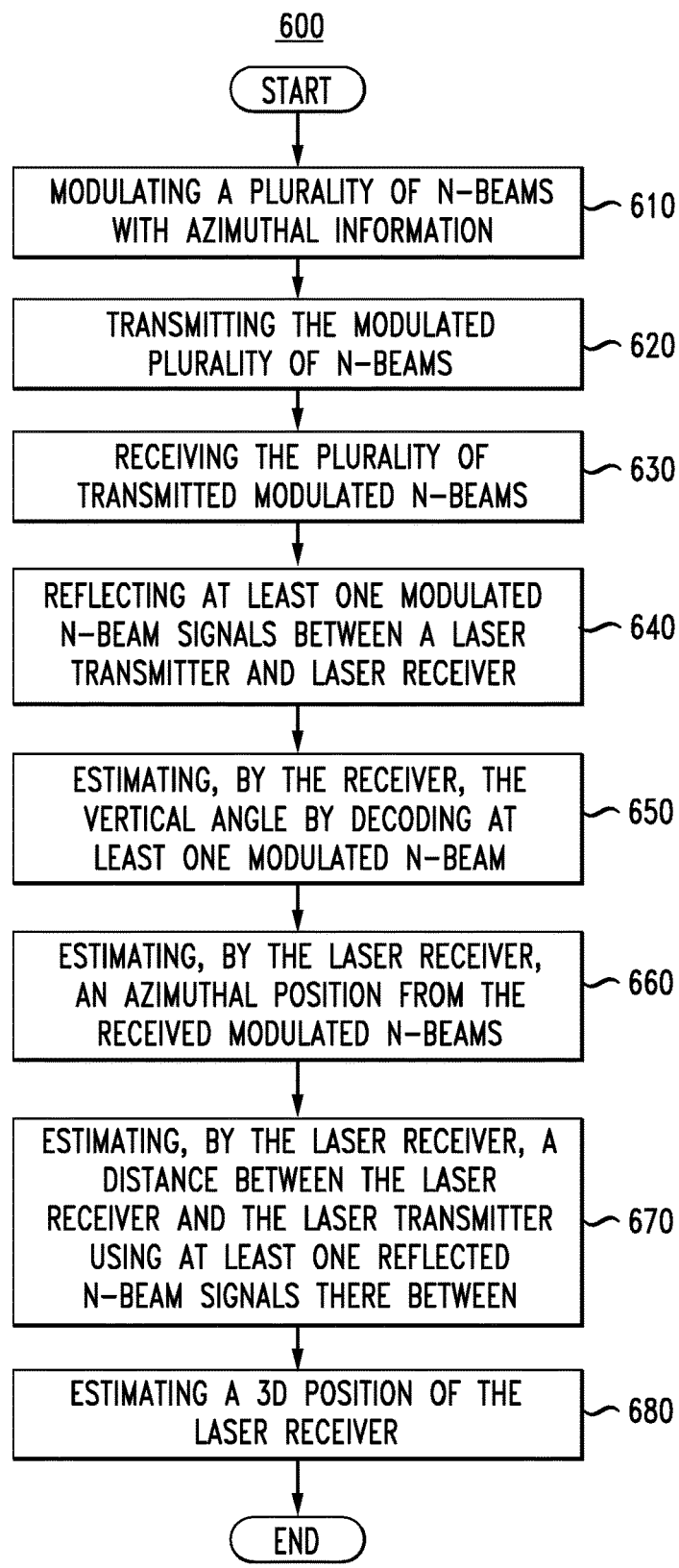
FIG. 6 shows a flowchart of illustrative operations for 3D laser measuring in accordance with an embodiment.

FIG. 6 shows a flowchart of illustrative operations 600 for 3D laser measuring in accordance with an embodiment. More particularly, step 610 details modulating a plurality of N-beams with azimuthal information, as detailed above, and transmitting (at step 620) the plurality of modulated N-beams, illustratively, from a laser transmitter. At step 630, receiving, by the laser receiver, the plurality of transmitted, modulated N-beams, and reflecting (at step 640) at least one of the modulated N-beams between the laser transmitter and the laser receiver. At step 650, estimating, by the laser receiver, the vertical angle by decoding at least one modulated N-beam. Then, estimating at step 660, by the laser receiver, an azimuthal position from the received plurality of modulated N-beams and estimating (at step 670), by the laser receiver, a distance between the laser receiver and the laser transmitter using at least one of the reflected modulated N-beam signals, as detailed above. As such, at step 680, the laser receiver estimates its 3D position using the vertical position, the azimuth information and the distance.

Figure 7:
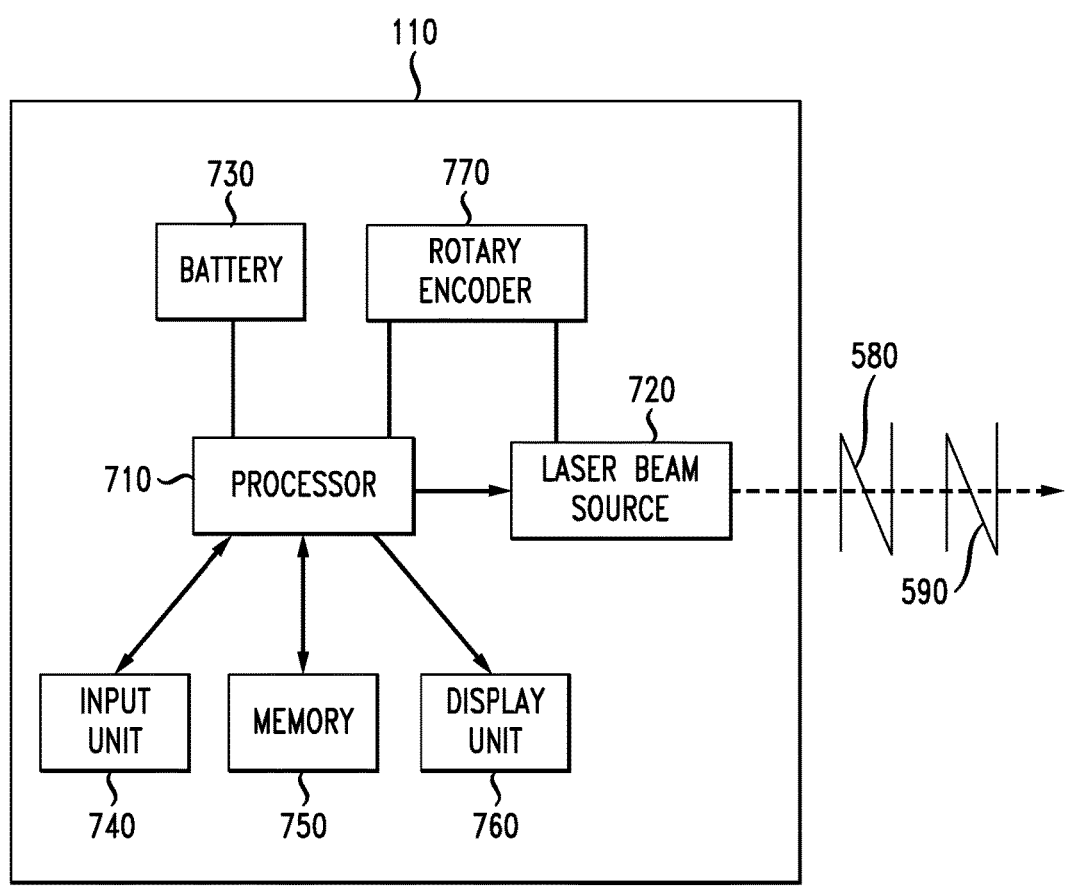
FIG. 7 shows a high-level block diagram of the laser transmitter of FIG. 1 in accordance with an embodiment.

FIG. 7 shows a high-level block diagram of laser transmitter 110 of FIG. 1 in accordance with an embodiment. As shown, laser transmitter 110 laser transmitter 110 is configured to modulate laser beams, e.g., N-shaped beams 580 and 590 (using frequency modulation or phase modulation, as detailed above) with an azimuth angle associated with the current position of laser transmitter 110. Illustratively, processor 710 and laser beam source 720 are utilized in such modulation to produce N-beams 580 and 590 (such N-beams being configured the same as N-beams 130-1 and 130-2 as shown in FIG. 1 and FIG. 5). Rotary encoder 770 is utilized to measure the instant angle and battery 730 supplies power to the transmitter in a well-known fashion. N-beams 580 and/or 590 are transmitted and received ultimately by laser receiver 135 as detailed herein above.

That is, in accordance with the embodiment, laser transmitter 110 is configured to modulate N-shaped beams 580 and 590 (using frequency modulation or phase modulation, as detailed above) with an azimuth angle associated with the current position of laser transmitter 110. In this way, laser receiver 135, upon receiving the transmitted modulated laser signal will be able to estimate its azimuthal position (i.e., an angle) by measuring the frequency (or phase) of the modulated signal pulse. Illustratively, memory 750 is provided with a variety of programs that when executed will carry out this and other operations of the various embodiments. Further, in accordance with the embodiment, the distance between the laser receiver and laser transmitter (illustratively, distance 160 between laser transmitter 110 and laser receiver 135) can also be determined directly by laser receiver 135 by using the modulated signal and at least two signal reflections between laser transmitter 110 and laser receiver 135, as detailed above. That is, configuring both laser transmitter 110 and laser receiver 135 with certain reflective surfaces, as detailed above, will allow for laser receiver 135 to calculate distance 160 using the double-reflected modulated signal between itself and laser transmitter 110. In particular, laser receiver 135 will compare the signal differences (e.g., frequency or phase) between the first signal received and the reflected signal received to calculate such distance which can be reported to the user as detailed herein above. Illustratively, laser transmitter includes display unit 760 to facilitate displaying information to a user and such user may also employ input unit 740 to take action based on the estimated 3D positioning provided and/or provide certain input to laser transmitter 110 for operational purposes.

Figure 8:
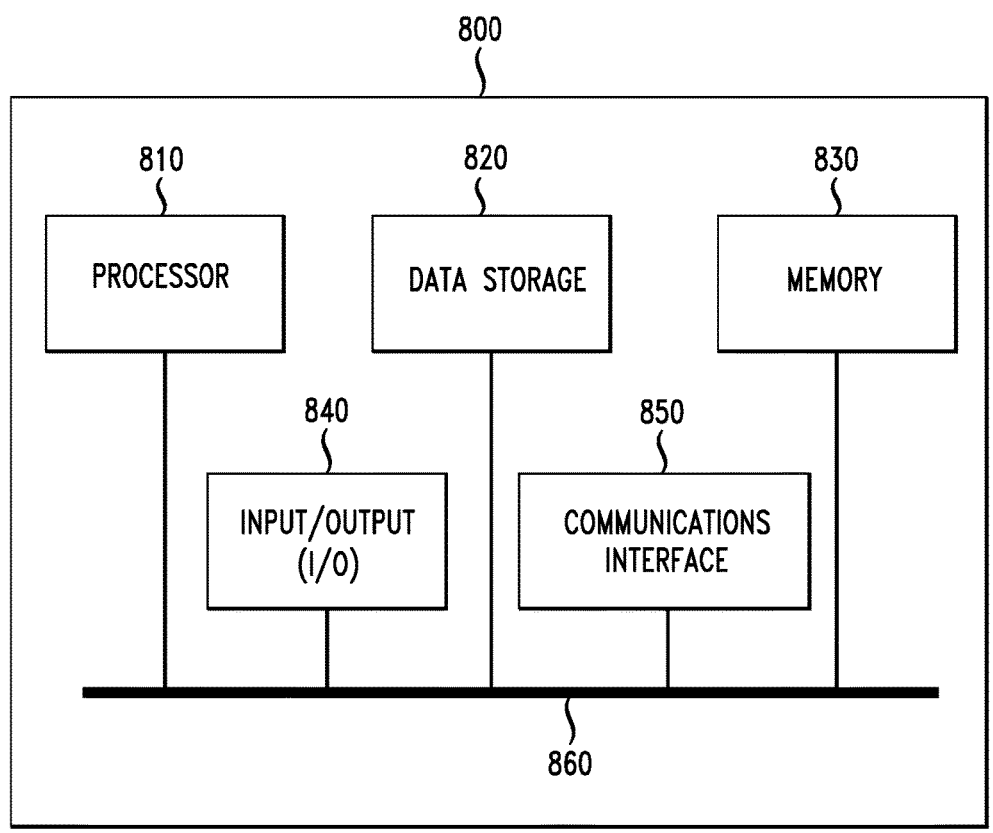
FIG. 8 shows is a high-level block diagram of an exemplary computer in accordance with an embodiment.

As detailed above, the various embodiments herein can be embodied in the form of methods and apparatuses for practicing those methods. The disclosed methods may be performed by a combination of hardware, software, firmware, middleware, and computer-readable medium (collectively "computer") installed in and/or communicatively connected to a user device. FIG. 8 is a high-level block diagram of an exemplary computer 800 that may be used for implementing a method for 3D laser measuring in accordance with the various embodiments herein. Computer 800 comprises a processor 810 operatively coupled to a data storage device 820 and a memory 830. Processor 810 controls the overall operation of computer 800 by executing computer program instructions that define such operations. Communications bus 860 facilitates the coupling and communication between the various components of computer 800. The computer program instructions may be stored in data storage device 820, or a non-transitory computer readable medium, and loaded into memory 830 when execution of the computer program instructions is desired. Thus, the steps of the disclosed method (see, e.g., FIG. 6 and the associated discussion herein above) can be defined by the computer program instructions stored in memory 830 and/or data storage device 820 and controlled by processor 810 executing the computer program instructions. For example, the computer program instructions can be implemented as computer executable code programmed by one skilled in the art to perform the illustrative operations defined by the disclosed method. Accordingly, by executing the computer program instructions, processor 810 executes an algorithm defined by the disclosed method. Computer 800 also includes one or more communication interfaces 850 for communicating with other devices via a network (e.g., a wireless communications network) or communications protocol (e.g., Bluetooth®). For example, such communication interfaces may be a receiver, transceiver or modem for exchanging wired or wireless communications in any number of well-known fashions. Computer 800 also includes one or more input/output devices 840 that enable user interaction with computer 800 (e.g., camera, display, keyboard, mouse, speakers, microphone, buttons, etc.).

Processor 810 may include both general and special purpose microprocessors, and may be the sole processor or one of multiple processors of computer 800. Processor 810 may comprise one or more central processing units (CPUs), for example. Processor 810, data storage device 820, and/or memory 830 may include, be supplemented by, or incorporated in, one or more application-specific integrated circuits (ASICs) and/or one or more field programmable gate arrays (FPGAs).

Data storage device 820 and memory 830 each comprise a tangible non-transitory computer readable storage medium. Data storage device 820, and memory 830, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 840 may include peripherals, such as a camera, printer, scanner, display screen, etc. For example, input/output devices 840 may include a display device such as a cathode ray tube (CRT), plasma or liquid crystal display (LCD) monitor for displaying information to the user, a keyboard, and a pointing device such as a mouse or a trackball by which the user can provide input to computer 800.

It should be noted that for clarity of explanation, the illustrative embodiments described herein may be presented as comprising individual functional blocks or combinations of functional blocks. The functions these blocks represent may be provided through the use of either dedicated or shared hardware, including, but not limited to, hardware capable of executing software. Illustrative embodiments may comprise digital signal processor ("DSP") hardware and/or software performing the operation described herein. Thus, for example, it will be appreciated by those skilled in the art that the block diagrams herein represent conceptual views of illustrative functions, operations and/or circuitry of the principles described in the various embodiments herein. Similarly, it will be appreciated that any flowcharts, flow diagrams, state transition diagrams, pseudo code, program code and the like represent various processes which may be substantially represented in computer readable medium and so executed by a computer, machine or processor, whether or not such computer, machine or processor is explicitly shown. One skilled in the art will recognize that an implementation of an actual computer or computer system may have other structures and may contain other components as well, and that a high level representation of some of the components of such a computer is for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A laser receiver comprising:
   at least one reflective surface attached thereto;
   a photo detection unit for receiving a plurality of modulated laser beams, the plurality of modulated laser beams being transmitted by a laser transmitter having at least one reflective surface attached thereto, and each laser beam of the plurality of laser beams being modulated with at least azimuthal angle information; and
   a processor for estimating an azimuthal position, associated with the laser receiver, using particular ones of the plurality of modulated laser beams, and estimating a distance between the laser receiver and the laser transmitter using at least one reflected modulated laser beam that has been reflected between the at least one reflective surface of the laser receiver and the at least one reflective surface of the laser transmitter.

2. The laser receiver of claim 1 wherein the at least one reflective surface of the laser receiver is a flat surface of a retro reflector.

3. The laser receiver of claim 2 wherein the azimuthal angle information is associated with the laser transmitter, and the azimuthal position is an azimuthal angle associated with the laser receiver.

4. The laser receiver of claim 3 wherein the processor estimates a vertical position, associated with the laser receiver, using particular ones of the plurality of modulated laser beams.

5. The laser receiver of claim 4 wherein the processor estimates a 3D position of the laser receiver using the vertical position, the azimuthal angle and the distance.

6. The laser receiver of claim 3 wherein the distance is estimated by comparing a signal difference between a first modulated laser beam received by the laser receiver and a second modulated laser beam, the second modulated laser beam being the at least one reflected modulated laser beam that has been reflected between the at least one reflective surface of the laser receiver and the at least one reflective surface of the laser transmitter.

7. The laser receiver of claim 2 wherein the at least one reflective surface of the laser receiver is a corner reflector having a plurality of mirror edges configured around a photo diode window, and the at least one reflective surface of the laser transmitter is a corner reflector having a plurality of mirror edges configured around a laser diode window.

8. The laser receiver of claim 1 wherein the plurality of modulated laser beams are modulated using a frequency modulation.

9. The laser receiver of claim 1 wherein the plurality of modulated laser beams are modulated using a phase modulation.

10. The laser receiver of claim 1 wherein each laser beam of the plurality of modulated laser beams is an N-shaped beam.

11. A position measuring method for a laser receiver, the method comprising:
receiving a plurality of modulated laser beams, each laser beam of the plurality of laser beams being modulated with at least azimuthal angle information;
reflecting one of the modulated laser beams received off a reflective surface attached to the laser receiver to produce a first reflected modulated beam signal;
receiving the first reflected modulated laser beam signal by a reflective surface attached to a laser transmitter which transmits the plurality of modulated laser beams;
reflecting the first reflected modulated laser beam received off the reflective surface attached to the laser transmitter to produce a second reflected modulated beam signal;
receiving the second reflected modulated laser beam signal at the laser receiver;
estimating a distance between the laser receiver and the laser transmitter using the one of the modulated laser beams received and the second reflected modulated laser beam signal;
and
estimating an azimuthal position, associated with the laser receiver, using the plurality of modulated laser beams.

12. The method of claim 11 wherein the reflective surface of the laser receiver is a flat surface of a retro reflector.

13. The method of claim 12 wherein the azimuthal angle information is associated with the laser transmitter, and the azimuthal position is an azimuthal angle associated with the laser receiver.

14. The method of claim 13 further comprising:
estimating a vertical position, associated with the laser receiver, using particular ones of the plurality of modulated laser beams.

15. The method of claim 14 further comprising:
estimating a three dimensional position of the laser receiver using the vertical position, the azimuthal angle and the distance.

16. The method of claim 12 wherein the first reflected modulated beam signal and the second reflected modulated beam signal are reflected between a corner mirror of a plurality of corner mirrors configured around a photo diode window in the laser receiver and a corner mirror a plurality of corner mirrors configured around a laser diode window of the laser transmitter.

17. The method of claim 12 wherein the distance is estimated by comparing a phase difference between the first reflected modulated laser beam signal and the second reflected modulated laser beam signal.

18. The method claim 11 wherein the plurality of modulated laser beams are modulated using a frequency modulation.

19. The method of claim 11 wherein the plurality of modulated laser beams are modulated using a phase modulation.

20. The method of claim 11 wherein each laser beam of the plurality of modulated laser beams is an N-shaped beam.

21. A non-transitory computer-readable medium storing computer program instructions for position measuring by a laser receiver, the computer program instructions, when executed on a processor, cause the processor to perform operations comprising:
receiving a plurality of modulated laser beams, each laser beam of the plurality of modulated laser beams being modulated with at least azimuthal angle information of a laser transmitter that transmitted the plurality of modulated laser beams;
estimating an azimuthal position of the laser receiver using the plurality of modulated laser beams; and
estimating a distance between the laser receiver and the laser transmitter using at least one modulated laser beam which has been reflected between the laser receiver and a laser transmitter that transmitted the plurality of modulated laser beams,
wherein the at least one modulated laser beam has been reflected by:
reflecting one of the modulated laser beams received off a reflective surface attached to the laser receiver to produce a first reflected modulated beam signal;
receiving the first reflected modulated laser beam signal by a reflective surface attached to a laser transmitter which transmits the plurality of modulated laser beams;
reflecting the first reflected modulated laser beam received off the reflective surface attached to the laser transmitter to produce a second reflected modulated beam signal; and
receiving the second reflected modulated laser beam signal at the laser receiver.

22. The non-transitory computer-readable medium of claim 21 wherein the operations further comprise:
estimating a vertical position, associated with the laser receiver, using particular ones of the plurality of modulated laser beams; and
estimating a three dimensional position of the laser receiver using the vertical position, the azimuthal position and the distance.

23. The non-transitory computer-readable medium of claim 21 wherein the reflective surface of the laser receiver is a corner reflector having a plurality of mirror edges configured around a photo diode window, and the reflective surface of the laser transmitter is a corner reflector having a plurality of mirror edges configured around a laser diode window.

24. The non-transitory computer-readable medium of claim 21 wherein each laser beam of the plurality of modulated laser beams is an N-shaped beam.

25. A laser transmitter comprising:
a laser source for transmitting a plurality of modulated laser beams to a laser receiver having at least one reflective surface attached thereto, each laser beam of the plurality of laser beams being modulated with at least azimuthal angle information for use in estimating an azimuthal position using a particular one of the plurality of modulated laser beams, the laser source having at least one reflective surface attached thereto for receiving and reflecting a first reflected modulated laser beam signal received from the reflective surface attached to the laser receiver thereby producing a second reflected modulated beam signal back to the laser receiver, and
wherein a distance between the laser receiver and the laser transmitter is determined using a particular one of the modulated laser beams received by the laser receiver and the second reflected modulated beam signal.

26. The laser transmitter of claim 25 wherein the plurality of modulated laser beams are modulated using a frequency modulation.

27. The laser transmitter of claim 25 wherein the plurality of modulated laser beams are modulated using a phase modulation.

28. The laser transmitter of claim 25 wherein each laser beam of the plurality of modulated laser beams is an N-shaped beam.

29. The laser transmitter of claim 25 the at least one reflective surface of the laser receiver is a corner reflector having a plurality of mirror edges configured around a photo diode window, and the at least one reflective surface of the laser transmitter is a corner reflector having a plurality of mirror edges configured around a laser diode window.

* * * * *

UNITED STATES PATENT AND TRADEMARK OFFICE
CERTIFICATE OF CORRECTION

PATENT NO. : 10,145,671 B2
APPLICATION NO. : 15/086377
DATED : December 4, 2018
INVENTOR(S) : Nikolay V. Khatuntsev It is certified that error appears in the above-identified patent and that said Letters Patent is hereby corrected as shown below:

In the Specification

Column 9, Line 8 "Azimuthal angle $\theta = ph_{x1}ph_{ref}$," should read "Azimuthal angle $\theta = ph_{x1} - ph_{ref}$,"

Signed and Sealed this
Twenty-sixth Day of February, 2019

Andrei Iancu
*Director of the United States Patent and Trademark Office*